Patented Mar. 15, 1932

1,849,209

UNITED STATES PATENT OFFICE

HANS STOCKHAUSEN, OF KREFELD, FRITZ SCHLOTTERBECK, OF HEIDELBERG, AND CONRAD CREMER AND ARNULF HECKING, OF KREFELD, GERMANY

PROCESS OF SULPHONATING OILS AND FATS

No Drawing. Application filed July 5, 1927, Serial No. 203,674, and in Switzerland March 30, 1927.

The action of concentrated sulphuric acid on oils, fats, their fatty acids and mixtures thereof is known. For instance, Turkey red oils are produced by allowing concentrated sulphuric acid to act upon castor oil in the usual way, washing the reaction product after it has stood for a while, with water or dilute salt solutions and after the acid liquor has settled, neutralizing the product as required.

In comparison with ordinary soaps the solutions of the products obtained in this manner show a certain improvement as regards stability to acids, as well as to lime and magnesium salts, and with respect to moistening capacity, but this improvement is only slight, because the solutions of the said products are decomposed with precipitation of fatty acid by an addition of comparatively small amounts of acids so that they cannot be used as wetting-out and equalizing agents for instance in acid dye-baths. They are also insufficiently stable with respect to lime and magnesium salts.

It is known that the improved stability as compared with ordinary soaps, of Turkey red oils, which consist of a mixture of sulphonated and non-sulphonated soap-like substances is due to the amount of sulphonated constituents, i. e. fatty sulphuric acid esters, contained in these products, and it is also known that the moistening capacity and the stability with respect to acids and alkaline earth salts etc. is greater the larger there is of the amount of sulphonated constituents contained in the Turkey red oil or similar products (for instance monopol soap). Up to the present time however it has not been possible substantially to increase the content of sulphonated constituents in the finished product.

It has been found that when sulphuric acid is used in a quantity of at least 45% calculated on the amount of the oils, fats, fatty acids and mixtures thereof to be sulphonated, i. e. in amounts which substantially exceed the percentage hitherto generally usual (15-30%), a reaction product is obtained which contains far more organically bound sulphuric acid than the products prepared by methods hitherto usual, if the following conditions are observed:

The sulphuric acid of a specific gravity of at least 1.800 is added as rapidly as possible with intense cooling, care being taken that the temperature of the reaction mixture does not exceed about 10–15° C.; the product is then washed immediately and neutralized as desired, partially or wholly.

Consequently the products obtained according to the present process differ very considerably in regard to their properties, from ordinary Turkey red oils and similar products (monopol soap, etc.). Their solutions show an extraordinary stability to acids and have a pronounced moistening capacity. Their field of employment is therefore incomparably greater than that of ordinary Turkey red oils. They can be used extensively for instance in the textile, leather and paper industries, either alone or in combination with other oils or fats, or with hydrocarbons etc.

The amount of sulphuric acid required for sulphonation varies for instance between 45% and 100% according to the nature of the oils or fats or their fatty acids or mixtures thereof to be treated. Moreover, the kind of treatment with concentrated sulphuric acid, the temperatured during the reaction and the washing are important factors for a satisfactory result. The temperature during the reaction preferably does not exceed 10° to 15° C. and the washing should be carried out as quickly as possible.

Example

Into 100 parts of castor oil are introduced 100 parts of sulphuric acid of 66° Bé. as quickly as possible while continually stirring. By intense cooling care is taken that the temperature of the reaction mixture does not exceed 10–15° C. The product is then washed at once with water or salt solution, the acid liquor drained off as soon as possible and neutralization carried out in the usual way, partially or wholly as required.

We claim:

1. A process for sulphonating substances of the type of oils, fats, their fatty acids and mixtures of the same, consisting in rapidly adding to the said substances during continuous stirring sulphuric acid of a specific gravity of at least 1.800 in a quantity of 45 to 100% calculated on the amount of the substance to be sulphonated and simultaneously cooling the reaction mixture to at least 10 to 15° C., thereupon immediately washing the product in a salt solution, then drawing off said salt solution and finally at least partially neutralizing the product.

2. A process for sulphonating substances of the type of oils, fats, their fatty acids and mixtures of the same, consisting in rapidly adding to the said substances during continuous stirring sulphuric acid of a specific gravity of at least 1.800 in a quantity of 45 to 100% calculated on the amount of the substance to be sulphonated and simultaneously cooling the reaction mixture to at least 10 to 15° C., thereupon immediately washing the product in a salt solution, then drawing off said salt solution and finally neutralizing the product.

3. As new products of manufacture, the sulphuric acid compounds of substances of the type of oils, fats, their fatty acids and mixtures of the same obtainable from a process as described in claim 1, said products being characterized by an extraordinary capacity of resistance to acids, by their use as excellent wetting-out agents and a great stability with respect to lime salts and magnesia salts.

4. A process for sulphonating castor oil, consisting in rapidly adding to the said castor oil during continuous stirring sulphuric acid of a specific gravity of at least 1.800 in a quantity of 45 to 100% calculated on the amount of the substance to be sulphonated and simultaneously cooling the reaction mixture to at least 10 to 15° C., thereupon immediately washing the product in a salt solution, then drawing off said salt solution and finally at least partially neutralizing the product.

5. A process for sulphonating castor oil, consisting in rapidly adding to the said castor oil during continuous stirring sulphuric acid of a specific gravity of at least 1.800 in a quantity of 45 to 100% calculated on the amount of the substance to be sulphonated and simultaneously cooling the reaction mixture to at least 10 to 15° C., thereupon immediately washing the product in a salt solution, then drawing off said salt solution and finally neutralizing the product.

6. The process which comprises rapidly introducing into 100 parts by weight of castor oil 100 parts by weight of sulphuric acid of 66° Bé. while continually stirring and simultaneously cooling the reaction mixture to at least 10 to 15° C., thereupon immediately washing the product in a salt solution, and finally at least partially neutralizing the product.

7. The process which comprises rapidly introducing into 100 parts by weight of castor oil 100 parts by weight of sulphuric acid of 66° Bé. while continually stirring and simultaneously cooling the reaction mixture to at least 10 to 15° C., thereupon immediately washing the product in a salt solution, and finally neutralizing the product.

8. As new products of manufacture the sulphuric acid compounds of castor oil obtainable from the process described in claim 4, being characterized by an extraordinary capacity of resistance to acids, by their use as excellent wetting-out agents and a great stability with respect to lime salts and magnesia salts.

9. As new products of manufacture the sulphuric acid compounds of castor oil obtainable from the process described in claim 5, being characterized by an extraordinary capacity of resistance to acids, by their use as excellent wetting-out agents and a great stability with respect to lime salts and magnesia salts.

10. As new products of manufacture the sulphuric acid compounds of castor oil obtainable from the process described in claim 6, being characterized by an extraordinary capacity of resistance to acids, by their use as excellent wetting-out agents and a great stability with respect to lime salts and magnesia salts.

11. As new products of manufacture the sulphuric acid compounds of castor oil obtainable from the process described in claim 7, being characterized by an extraordinary capacity of resistance to acids, by their use as excellent wetting-out agents and a great stability with respect to lime salts and magnesia salts.

In testimony whereof we have signed our names to this specification.

HANS STOCKHAUSEN.
FRITZ SCHLOTTERBECK.
CONRAD CREMER.
ARNULF HECKING.